US011449786B2

(12) United States Patent
Gottschlich et al.

(10) Patent No.: US 11,449,786 B2
(45) Date of Patent: Sep. 20, 2022

(54) METHODS AND APPARATUS TO GENERATE ANOMALY DETECTION DATASETS

(71) Applicant: Intel Corporation, Santa Clara, CA (US)

(72) Inventors: Justin E. Gottschlich, Santa Clara, CA (US); Naila Farooqui, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 15/591,886

(22) Filed: May 10, 2017

(65) Prior Publication Data

US 2018/0330253 A1 Nov. 15, 2018

(51) Int. Cl.
*G06N 20/00* (2019.01)

(52) U.S. Cl.
CPC ................... *G06N 20/00* (2019.01)

(58) Field of Classification Search
CPC ..................................... G06N 20/00
See application file for complete search history.

(56) References Cited

U.S. PATENT DOCUMENTS

2017/0061322 A1* 3/2017 Chari ................. H04L 63/1425

OTHER PUBLICATIONS

Wagner et al.,("FLAME: A Flow-Level Anomaly Modeling Engine", in CSET, Jul. 28, 2008, pp. 1-6) (Year: 2008).*
Hoag et al., ("A parallel General-Purpose Synthetic Data Generator", SIGMOD Record, Mar. 2007, vol. 36, No. 1, pp. 19-24) (Year: 2007).*
Anna Buczak, ("A Survey of Data Mining and Machine Learning Methods for Cyber Security Intrusion Detection", IEEE Communications Surveys and Tutorials, vol. 18, No. 2, Second Quarter 2016, pp. 1153-1176) (Year: 2016).*
Lin et al. ("Dynamic Sampling Approach to Training Neural Networks for Multiclass Imbalance Classification", IEEE Transactions on Neural Networks and Learning Systems, vol. 24, No. 4, Apr. 2013, pp. 647-660) (Year: 2013).*
M. Nahari ("A parallel Algorithm for Anomaly Detection Using Data Clustering on Grid", International Journal on "Technical and Physical Problems of Engineering", Issue 21, vol. 6, No. 4, Dec. 2014, pp. 112-121) (Year: 2014).*
Vasilomanolakis et al. ("Towards the creation of synthetic, yet realistic, intrusion detection datasets", NOMS 2016-2016 IEEE/IFIP Network Operations and Management Symposium, 2016, pp. 1-6) (Year: 2016).*

(Continued)

*Primary Examiner* — Brian M Smith
*Assistant Examiner* — Robert Lewis Kulp
(74) *Attorney, Agent, or Firm* — Hanley, Flight & Zimmerman, LLC

(57) ABSTRACT

Example methods and apparatus to generate anomaly detection datasets are disclosed. An example method to generate an anomaly detection dataset for training a machine learning model to detect real world anomalies includes receiving a user definition of an anomaly generator function, executing, with a processor, the anomaly generator function to generate user-defined anomaly data, and combining the user-defined anomaly data with nominal data to generate the anomaly detection dataset.

20 Claims, 7 Drawing Sheets

(56) References Cited

OTHER PUBLICATIONS

Bao et al. ("A C-SVM based Anomaly Detection Method for Multi-dimensional Sequence over Data Stream", 2016 IEEE 22nd International Converence on Parallel and Distributed Systems, 2016, pp. 948-955) (Year: 2016).*

Abe et al. ("Outlier Detection by Active Learning", KDD'06, Aug. 20-23, 2006, pp. 504-509) (Year: 2006).*

Liu et al. ("Isolation-Based Anomaly Detection", ACM Transactions on Knowledge Discovery from Data, vol. 6, No. 1, Article 2, 2012 , pp. 1-39) (Year: 2012).*

Batista et al. ("A study of the behavior of several methods for balancing machine learning training data", ACM SIGKDD explorations newsletter 6.1, 2004, pp. 20-29) (Year: 2004).*

Keogh et al., "Data Mining Large Medical Time Series Databases," accessed on Mar. 29, 2017, [http://www.cs.ucr.edu/~eamonn/discords/], 1 page.

Dan Gilick, "A Resurgence of Neural Networks in Machine Learning," published Nov. 21, 2013, [https://datascience.berkeley.edu/machine-learning-neural-systems/], accessed on Mar. 29, 2017, 5 pages.

Kaggle, "Datasets," accessed on Mar. 29, 2017, [https://www.kaggle.com/datasets], 4 pages.

Goodfellow et al., "Deep Learning," accessed on Mar. 29, 2017, [http://www.deeplearningbook.org/], 2 pages.

Emmott et al., "Systematic Construction of Anomaly Detection Benchmarks from Real Data," Proceedings of the ACM SIGKDD 2013 Workshop on Outlier Detection and Description, Aug. 11, 2013, 6 pages.

Stanford Vision Lab, "ImageNet," 2016, [http://image-net.org/], accessed on Mar. 29, 2017, 1 page.

Salvador et al., "Learning States and Rules for Time Series Anomaly Detection," 2004, American Association for Artificial Intelligence, 6 pages.

"List of datasets for machine learning research," accessed on Mar. 29, 2017, [https://en.wikipedia.org/wiki/List_of_datasets_for_machine_learning_research], 41 pages.

Malhotra et al., "Long Short Term Memory Networks for Anomaly Detection in Time Series," ESANN 2015 Proceedings, European Symposium on Artificial Neural Networks, Computational Intelligence and Machine Learning, Bruges, Belgium, Apr. 22-24, 2015, 6 pages.

Lecun et al., "The Mnist Database of Handwritten Digits," accessed on Mar. 29, 2017, [http://yann.lecun.com/exdb/mnist/], 7 pages.

"The Numenta Anomaly Benchmark," accessed on Mar. 29, 2017, [https://github.com/numenta/NAB], 5 pages.

Charu C. Aggarwal, "Outlier Analysis," Second Edition, Nov. 25, 2016, 54 pages.

"Oveifilling," accessed on Mar. 29, 2017, [https://en.wikipedia.org/wiki/Overfitting], 4 pages.

Suju Rajan, "Yahoo Releases the Largest-ever Machine Learning Dataset for Researchers," 2016, 5 pages.

* cited by examiner

```
                data_list gen_sine_function()                              300
                {
                int time_start = 1, time_end = 100000;
                int normal_lowerbound_duration = 19;
      310       int normal_upperbound_duration = 20;
                int anomaly_lowerbound_duration = 1;
                int anomaly_upperbound_duration = 100;
                int anomaly_prob = 50;

data_generator data_gen(time_start, time_end,
                normal_lowerbound_duration,
      308       normal_upperbound_duration, anomaly_lowerbound_duration,
                anomaly_upperbound_duration, anomaly_prob);

function_variable *f = new function_variable("sine-wave");
      306       f->normal_function(&sine_normal_function);
                f->anomaly_function(&sine_anomaly_function);

312       data_gen.insert_variable(f)
      314       data_gen.generate_data();
      316       return data_gen.generated_data();
                } static float sine_normal_function(int timestamp)
                {
      302       int i = (timestamp – 1) % 360;
                float interval = (2*M_PI)/360;
                return float(sin(interval * i));
                } static float sine_anomaly_function(int timestamp)
                {
                int MULT = 1;
                if(rand()%2) MULT = -MULT;
                float LO = 0.2 * MULT;
                float HI = 0.5 * MULT;
      304       float perturb = (static_cast<float>(rand())/
                        static_cast<float>(RAND_MAX))*(HI-LO)+LO;
                int i = (timestamp-1)%360;
                float interval = (2*M_PI)/360;
                return float(sin(interval * i) + perturb);
                }
```

FIG. 3

| Training Data Description | Accuracy (%) | Recall | Precision | F1 Score | $F_{0.1}$ Score |
|---|---|---|---|---|---|
| Original | 89.95 | 0.02 | 1 | 0.03 | 0.61 |
| Generated | 93.85 | 0.43 | 0.88 | 0.58 | 0.87 |

METHODS AND APPARATUS TO GENERATE ANOMALY DETECTION DATASETS

FIELD OF THE DISCLOSURE

The present disclosure relates generally to anomaly detection and, more particularly, to methods and apparatus to generate anomaly detection datasets.

BACKGROUND

Machine learning is a type of artificial intelligence that provides computers with the ability to learn without being explicitly programmed. Machine learning focuses on systems that can change when exposed to new data. Interest in machine learning is increasing due to a combination of advances in computing, big data management, and machine learning algorithms, among other things. Anomaly detection is the process of identifying outliers in the inputs for a problem domain (e.g., MRI image interpretation). Example anomalies include, but are not limited to, a tumor in an MRI image, a fraudulent credit card fraud, a failure in a mechanical part or control system, etc. Some example impacts of anomalies include, but are not limited to, monetary losses, property damage, loss of life, etc.

BRIEF DESCRIPTION OF THE DRAWINGS

FIG. 3 is a listing of source code that may be executed to implement the example dataset generators of FIGS. 1 and 2.

DETAILED DESCRIPTION

Figure 1:
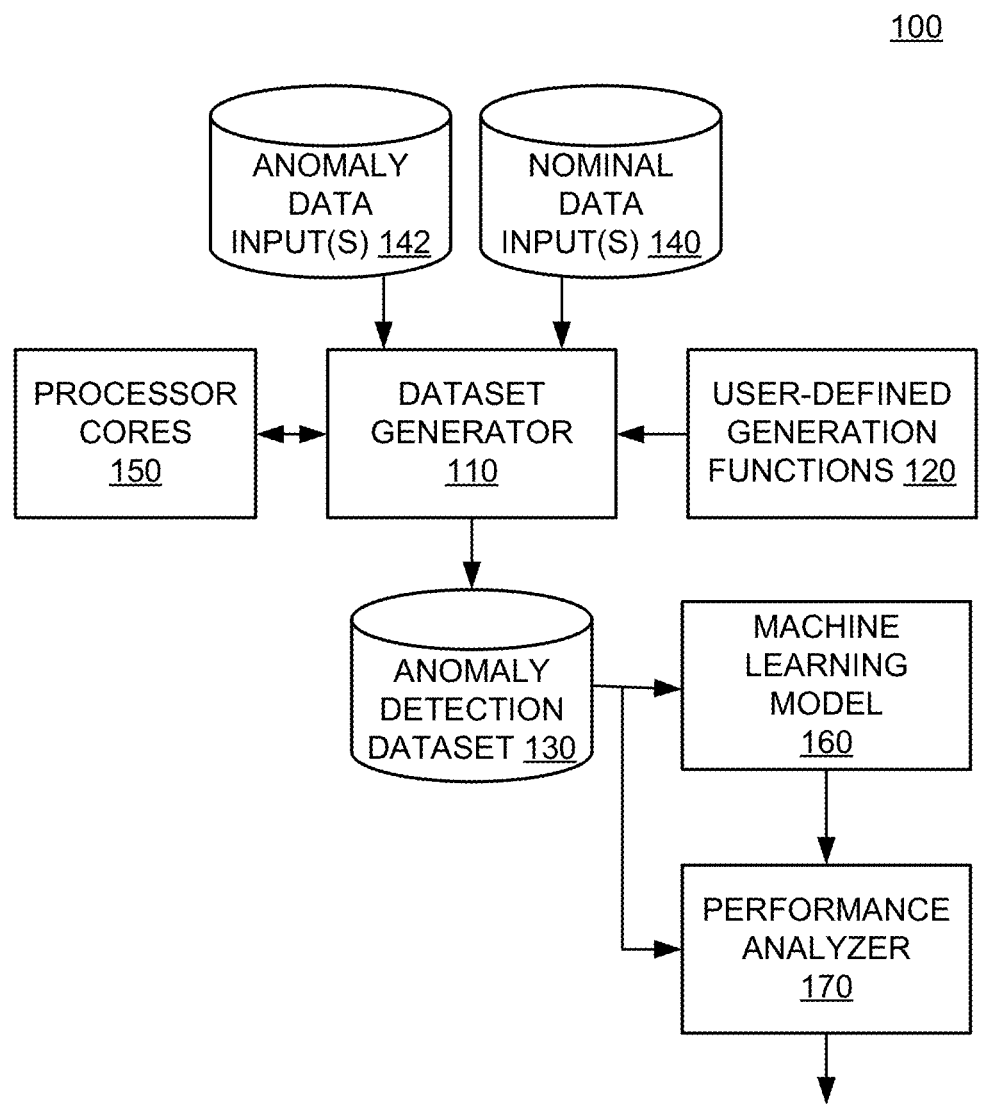
FIG. 1 illustrates an example machine learning system having a dataset generator, in accordance with this disclosure.

One of the key problems that prevents a wider adoption of machine learning is the lack of available datasets for training machine learning models. A dataset, which is a collection of, sometimes labeled, data, is needed to train a machine learning model for a particular problem domain. This is generally true regardless of whether the machine learning algorithm is supervised, semi-supervised, or unsupervised. Because of this, obtaining an appropriate dataset is usually one of the first steps in developing, training, validating, and testing machine learning models. It is widely accepted in the machine learning community that large datasets are needed to increase model classification accuracy and generalization, especially for deep learning.

The development of an appropriate machine learning model usually requires data of varying degrees, from simple to complex, to enable machine learning developers to continually refine and develop the machine learning model until it reaches an acceptable level of classification generalization. In practice, many machine learning models are generated through an iterative process of training and re-training on a growing dataset, which can be repeated numerous times before the model is ready for deployment. Because of this, manual manipulation of an existing dataset into smaller and larger datasets is often required, which increases engineering and research overhead.

Anomaly detection adds even more complexity to dataset generation and identification. Anomalies are, by definition, infrequent or rare, and therefore building (e.g., training) an accurate anomaly detection model can be challenging due to the scarcity of anomalous data and events in datasets. Further, anomalies tend to be continuous events, which means data presented for them must usually be in a time-series ordered form. Conventional wisdom is that a dataset need to be 100 times the size of the machine learning model. For example, a small neural network today has 250,000 nodes, so a dataset with 25 million data inputs may be needed. Because anomalies are rare, even larger datasets may be required. Many available datasets contain few, if any, anomalies. For at least these reasons, datasets for anomaly detection are often prohibitively expensive, prohibitively time consuming to generate, unavailable, of insufficient depth, of insufficient size, etc.

Example dataset generators that overcome at least these problems, and that can easily, quickly and inexpensively generate large anomaly detection datasets for anomaly detection are disclosed herein. The example methods and apparatus disclosed herein can be inexpensively implemented, and can generate anomaly detection datasets that can, for example, have very large numbers and varieties of anomalies, have labelled anomalies, etc. A benefit of generating such large anomaly detection datasets is the ready ability to train deep neural networks for anomaly detection, where anomalous data tends to be scarce and the current state-of-the-art anomaly datasets are not as mature as datasets for other problem domains. Disclosed examples can generate anomalies that are short or long in duration, are discrete or continuous, or combinations thereof. The characteristics and/or occurrence of anomalies can be readily defined using probabilities, multi-variate functions, etc. In some examples, a user can define anomaly generation using a few simple, highly programmable functions defined by a small amount of source code or interpretable code. For instance, it has been advantageously discovered that simple functions (e.g., a random number generator) can be used to generate anomalies that can be used to train a machine learning model to detect real world anomalies. In some example, real world anomalies are anomalies that can, do, or may occur during actual usage of a machine learning model. In contrast, in some examples, anomalies generated herein are generated using a random generation function. Such simple functions are inexpensive and efficient to implement. Some examples reduce or eliminate replicated or repeated data that can cause overfitting, a negative side-effect in machine learning training that can degrade a model's classification correctness and generalizability The disclosed example dataset generators can be implemented using large numbers of processor cores. In some examples, functions are executed by the processor cores in parallel and fully independently, without need for intercommunication, dependencies, memory sharing, data sharing, memory synchronization serialization overhead, etc. In the industry, such examples are sometimes referred to as embarrassingly parallel systems. Such examples can enable a dramatic increase in the size of and the speed at which datasets can be generated and subsequently used, in practice, to train machine learning models to detect anomalies. Accordingly, machine learning researchers and practitioners can begin testing the generalization of a trained machine learning model within minutes, instead of hours or days or weeks as may be necessary with the existing datasets.

While the examples disclosed herein are described with reference to anomaly detection and/or anomaly detection datasets, it should be understood that the examples disclosed herein may be applied to generate datasets for other problem domains. Moreover, while examples of anomaly generation are disclosed herein, it should be understood that anomalies may be generated in other ways.

FIG. 1 is a block diagram of an example machine learning system 100. To generate anomaly data, the example machine learning system 100 of FIG. 1 includes an example dataset generator 110, in accordance with this disclosure. The example dataset generator 110 of FIG. 1 executes one or more example user-defined generation functions 120 to generate an anomaly detection dataset 130. The example user-defined generation functions 120 generate nominal (e.g., normal, typical, average, etc.) data, and anomaly data. In some examples, the dataset generator 110 generates the nominal data from nominal data input(s) 140 in the form of, for example, sample nominal signal waveforms, a prior nominal dataset, etc. for a problem domain. In some examples, the dataset generator 110 generates the anomaly data from anomaly data input(s) 142 in the form of, for example, sample anomaly signal waveforms, a prior anomaly dataset, etc. for a problem domain. In some examples, nominal data and anomaly data are data slices (e.g., a time sequence of data values) that are spliced together (e.g., arranged in sequence, interspersed, etc.) by the dataset generator 110 to form data that can be used to train a machine learning model for anomaly detection. In some examples, the user-defined generation functions 120 can be defined by a user in the form of simple, highly programmable functions defined by a small amount of simple source code or interpretable code that can be executed to implement the user-defined generation functions 120.

Repetition of data in the example anomaly detection dataset 130 can result in model overfitting, wherein a machine learning model models random error or noise instead of underlying relationships. Machine learning models are often more susceptible to overfitting due to replicated anomaly data than nominal data. Nominal data may not have the same sensitivity to overfitting as anomaly data due to its larger size, and because it may already span a broad range of values due, again, to its larger size compared to anomaly data. Accordingly, in some example, a user-defined generation function 120 includes one or more uniqueness parameters to control (e.g., limit, restrict, etc.) the repetition of data. Example uniqueness parameters set hard or soft limits on data repetition. In some examples, data in the anomaly detection dataset 130 is labeled. Relative to anomaly detection, data may be labeled "nominal" or "anomalous."

In some examples, multiple instances of the user-defined generation functions 120 are executed in parallel on any number and/or type(s) of example processor cores 150. In some examples, the multiple instances are executed by an embarrassingly parallel system. Making the generation of large datasets having, for example, tens or hundreds of millions of data inputs time efficient and cost effective. Thereby, making the implementation of deep learning, and the use of huge datasets—so called "large data" for problem domains of increasingly complexity, technically and economically feasible.

A processor core 150 may be implemented by, for example, one or more analog or digital circuit(s), logic circuits, programmable processor(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), etc.

The example anomaly detection dataset 130 of FIG. 1 can be used to train an example machine learning model 160 in the form of, for example, a neural network. The neural network may have any number of nodes in any topology. The machine learning model 160 may be trained using any number and/or type(s) of algorithm(s), method(s), process(es), etc.

To test the performance of the machine learning model 160, the example machine learning system 100 includes an example performance analyzer 170. The example performance analyzer 170 of FIG. 1 compares the labels of test inputs of the machine learning model 160 with output classifications of "nominal" or "anomalous" of the machine learning model 160 for the test inputs. The performance analyzer 170 determines performance metrics for the machine learning model 160 based on the comparisons.

Figure 2:
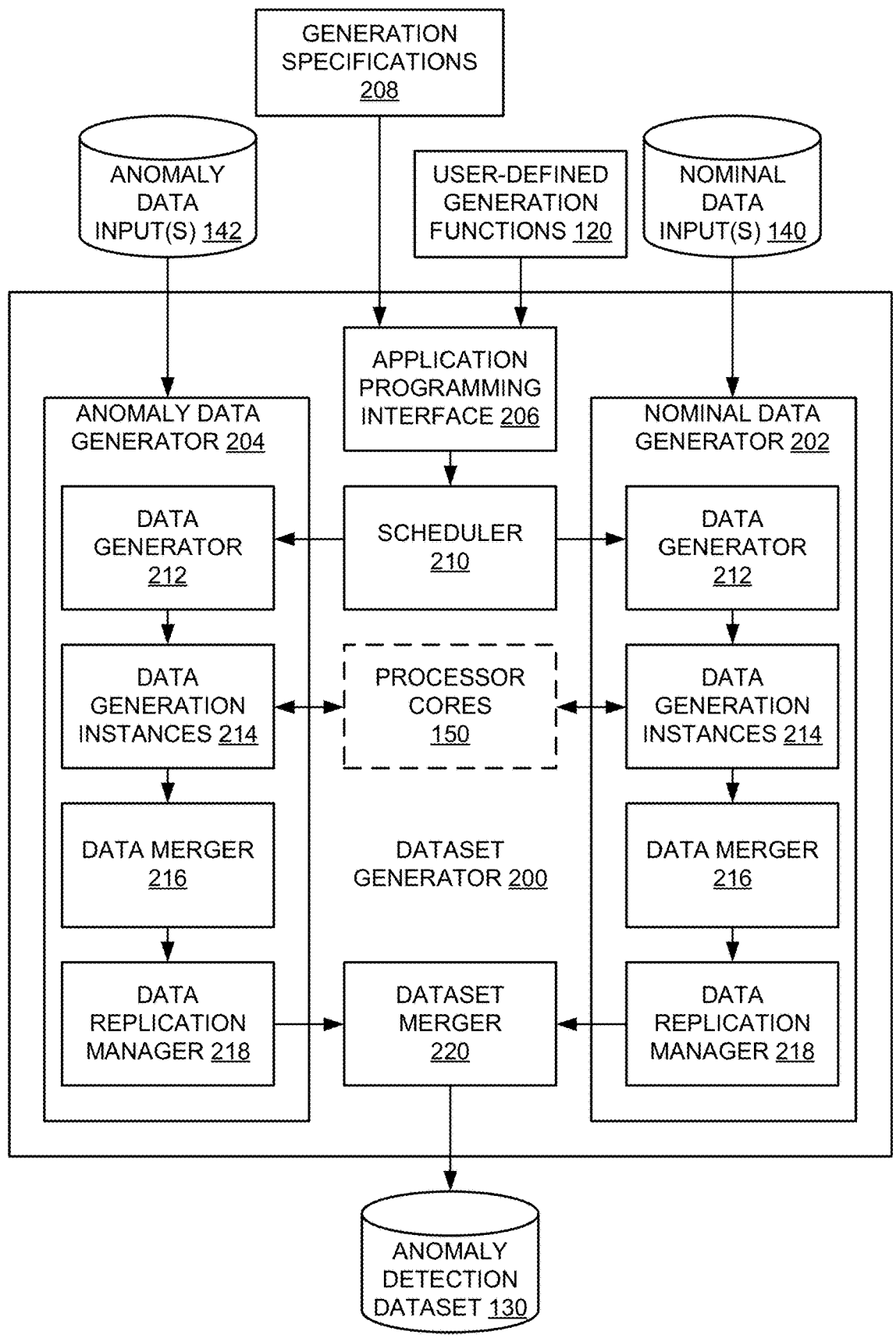
FIG. 2 is a block diagram illustrating an example implementation for the example dataset generator of FIG. 1.

FIG. 2 is a block diagram of an example dataset generator 200 that may be used to implement the example dataset generator 110 of FIG. 1. To generate nominal data, the example dataset generator 200 of FIG. 2 includes an example nominal data generator 202. To generate anomaly data, the example dataset generator 200 of FIG. 2 includes an example anomaly data generator 204. Because the example user-defined generation functions 120 can be defined separately for anomaly data and nominal data, the example nominal data generator 202 and the example anomaly data generator 204 can execute user-defined generation functions 120 in parallel. Moreover, the user-defined generation functions 120 allow the anomaly data and/or the nominal data for different time periods to be generated in parallel. In the example of FIG. 1, the example nominal data generator 202 and the example anomaly data generator 204 are implemented identically, and are differentiated based on provided control inputs and/or user-defined generation functions. For example, by providing different user-defined generation functions to the nominal data generator 202 and the anomaly data generator 204 they can implement different functionality. However, the nominal data generator 202 and the anomaly data generator 204 may be implemented differently.

To receive, from a user, definitions of user-defined generation functions (e.g., the example user-defined generation functions 120), the example dataset generator 200 of FIG. 2 includes an example application programming interface (API) 206. The example API 206 of FIG. 2 enables a user to manually or programmatically provide, enter, upload, manage, etc. the definition of generation functions for nominal data and/or anomaly data. In some examples, generation functions are defined and provided to the API 206 in the form of one or more files containing source code or interpretable code. Additionally, and/or alternatively, generation functions may be provided via the API 206 as executable files. Example user-defined generation functions are discussed below in connection with FIG. 3.

In addition to the user-defined generation functions 120, the example API 206 enables a user to manually or programmatically provide, enter, upload, manage, etc. generation specifications 208 for the nominal data and/or anomaly data to be generated. Example generation specifications 208 include the number of entries (e.g., data slices) to be generated, one or more rules regarding uniqueness (e.g., do not allow, allow after an amount of time has passed, etc.), one or more random variables, one or more function variables, the period(s) of time of the nominal data to be generated, the period(s) of time of anomalous data to be generated, and the likelihood or probability of anomalies (e.g., 0.5% of the time). Example generation specifications 208 are discussed below in connection with FIG. 3. In some examples, the generation specifications 208 are part of the user-defined generation functions 120.

To define the data to generate, the example dataset generator 200 includes an example scheduler 210. The example scheduler 210 of FIG. 2, based on the generation specifications 208, determines a timeline of data to be generated, which includes the type(s) of data that will be created for each period (e.g., nominal or anomalous), the duration of each data slice, and their sequential ordering. For each of the nominal data generator 202 and the anomaly data generator 204, the example scheduler 210 creates (e.g., spawns, instantiates, etc.) an instance of an example data generator 212, and identifies the applicable portion(s) of the timeline of data to be generated to the created data generator 212. For instance, the portion(s) of the timeline relating to anomaly data generation is passed to the data generator 212 of the anomaly data generator 204.

The example data generators 212 of FIG. 2 create (e.g., spawn, instantiate, etc.) one or more example data generation instances 214, which are instances of applicable ones of the user-defined generation functions 120. For instance, the example data generator 212 of the anomaly data generator 204 creates data generation instances 214 of an anomaly generation function. The data generators 212 pass to each of their data generation instances 214 a time period of data to create, including all the necessary variable data needed to create complete the intended data for the time period. In some examples, the number of data generation instances 214 created by a data generator 212 is a heuristic based on several factors, such as the number of processor cores 150 available, the amount of the data to be created, the supplied uniqueness rules, probability of duplicate data entries, computational overhead to find and replace each duplicate, the total number of data values to be created for the thread, etc.

The example data generation instances 214 of FIG. 1 generate anomaly or nominal data based the generation specifications 208 provided by the user, including calling into user-defined function variable functions, and the time period specified by its data generator 212. Each data generation instance 214 stores the data slices it generates in its own map of timestamps and the data. If duplicate data is generated within a data generation instance's map, and unique values are required as specified by the user, the data generation instance 214 will discard the duplicate data and generate new data for that time period. The data generation instances 214 can be executed in serial and/or parallel on the one or more processor cores 150. In some examples, the data generation instances 214 are executed by an embarrassingly parallel system.

To combine the data generated by the example data generation instances 214, the example nominal data generator 202 and the example anomaly data generator 202 include a respective example data merger 216. The example data mergers 216 of FIG. 2 collect from the data generation instances 215 the data slices generated by the data generated instances 215 into, for example, a single map or data structure.

To remove duplicate data in the data collected by the example data mergers 216, the example nominal data generator 202 and the example anomaly data generator 204 include a respective example data replication manager 218. The data replication managers 218 eliminating duplicate data entries that may have been independently generated by two or more of the data generation instances 214. When duplicates are found, the data replication managers 218 handle the duplicate data as specified by uniqueness rules specified by the user.

To combine the nominal data generated by the example nominal data generator 202 with the anomaly data generated by the example anomaly data generator 204 the example dataset generator 200 includes an example dataset merger 220. The example dataset merger 220 combines the nominal data and the anomaly data by splicing the nominal data slices with the anomaly data slices based on the time-series periods associated pieces of the anomaly data and the nominal data. The time-series ordered data is stored in the example anomaly detection dataset 130 in a format specified by the user.

While example implementations of the example dataset generator 100, the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 are shown in FIGS. 1 and 2, one or more of the elements, processes and/or devices illustrated in FIGS. 1 and 2 may be combined, divided, re-arranged, omitted, eliminated and/or implemented in any other way. Further, the example dataset generator 100, the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 of FIGS. 1 and 2 may be implemented by hardware, software, firmware and/or any combination of hardware, software, and/or firmware. Thus, for example, any of the example dataset generator 100, the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 could be implemented by one or more analog or digital circuit(s), logic circuits, programmable processor(s), GPU(s), DSP(s), ASIC(s), PLD(s), and/or FPLD(s). When reading any of the apparatus or system claims of this patent to cover a purely software and/or firmware implementation, at least one of the example dataset generator 100, the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 is/are hereby expressly defined to include a tangible computer-readable storage medium storing the software and/or firmware. Further still, the example dataset generator 100, the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 of FIGS. 1 and 2 may include one or more elements, processes and/or devices in addition to, or instead of, those illustrated in FIGS. 1 and 2, and/or may include more than one of any or all of the illustrated elements, processes and devices.

FIG. 3 is a listing of example source code 300 that may be used to implement the example user-defined generation functions 120 and/or the example generation specifications 208. The example source code 300 of FIG. 3 includes an example user-defined generation function 302 to generate nominal data, and an example user-defined generation function 304 to generate anomaly data. The example user-defined generation function 302 of FIG. 3 generates sinusoidal nominal data. The example user-defined generation function 304 of FIG. 3 generates random anomaly data. In some examples, a user-defined generation function for nominal data creates copies of one or more nominal data inputs 140 (see FIGS. 1 and 2). In some examples, a user-defined generation function for anomaly data creates copies of one or more anomaly data inputs 142 (see FIGS. 1 and 2). The example function 302 of FIG. 3 generates a nominal data value at a specified timestamp, and returns the generated nominal data value. The example function 304 of FIG. 3 generates an anomaly data value at a specified timestamp, and returns the generated anomaly data value. While example functions 302 and 304 are shown in FIG. 3, user-defined generation functions may be created to generate nominal and anomaly data in any way.

As demonstrated below in connection with FIGS. 4-7, has been advantageously discovered that simple anomaly generation functions, such as the example random function of the user-defined generation function 304, can be used to generate anomalies that can be used to train a machine learning model to detect real world anomalies. Such simple functions are inexpensive and efficient to implement. The use of such user-defined generation functions can be simpler than capturing sample real world anomalies, defining specific anomalies, etc.

To store information regarding the functions 302 and 304, the example source code 300 includes an example function variable 306. The example function variable 306 includes a name "sine-wave" and pointers to the example functions 302 and 304.

To store data generation configuration information, the example source code 300 of FIG. 3 includes another example object 308. The example object 308 of FIG. 3 is created based the following example parameters 310:
    start_time—specifies the start time for the dataset
    end_time—specifies the end time for the dataset
    nominal_lowerbound_duration—specifies the minimum duration for a nominal data slice
    normal_upperbound_duration—specifies the maximum duration for a nominal data slice
    anomaly_lowerbound_duration—specifies the minimum duration for an anomaly data slice
    anomaly_upperbound_duration—specifies the maximum duration for an anomaly data slice
    anomaly_probability—specifies the probability of an anomaly occurring.

In the example of FIG. 3, the anomaly probability is specified as an integral value and the probability is computed as 1/<specified-integral-value>.

The example object 308 of FIG. 3 includes a method 312 to add the function variable 306, a method 314 executed by the scheduler 210 and data generators 212 to generate the nominal and anomaly time slices, and a method 316 executed by the data mergers 216 to collect the data generated by the example data generation instances 214.

Figure 4:
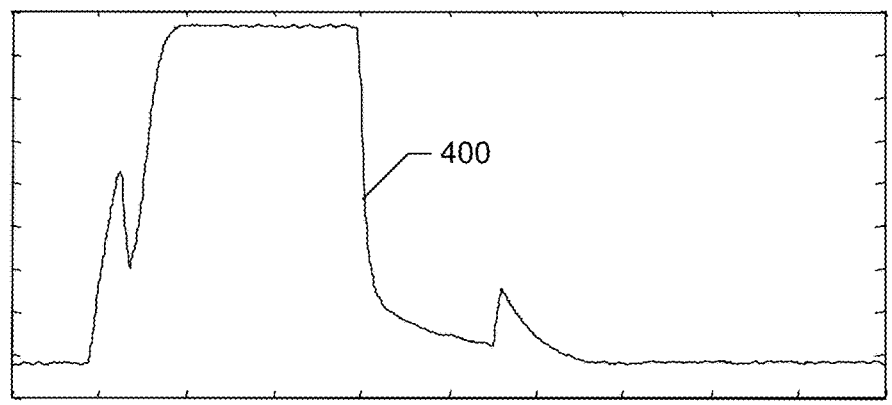
FIG. 4 is a graph of example nominal data.

Example real world performance improvements that may be obtained using the teachings of this disclosure will now be described in connection with FIGS. 4-9. FIG. 4 is a graph of an example real world nominal signal 400 for the Space Shuttle.

Figure 5:
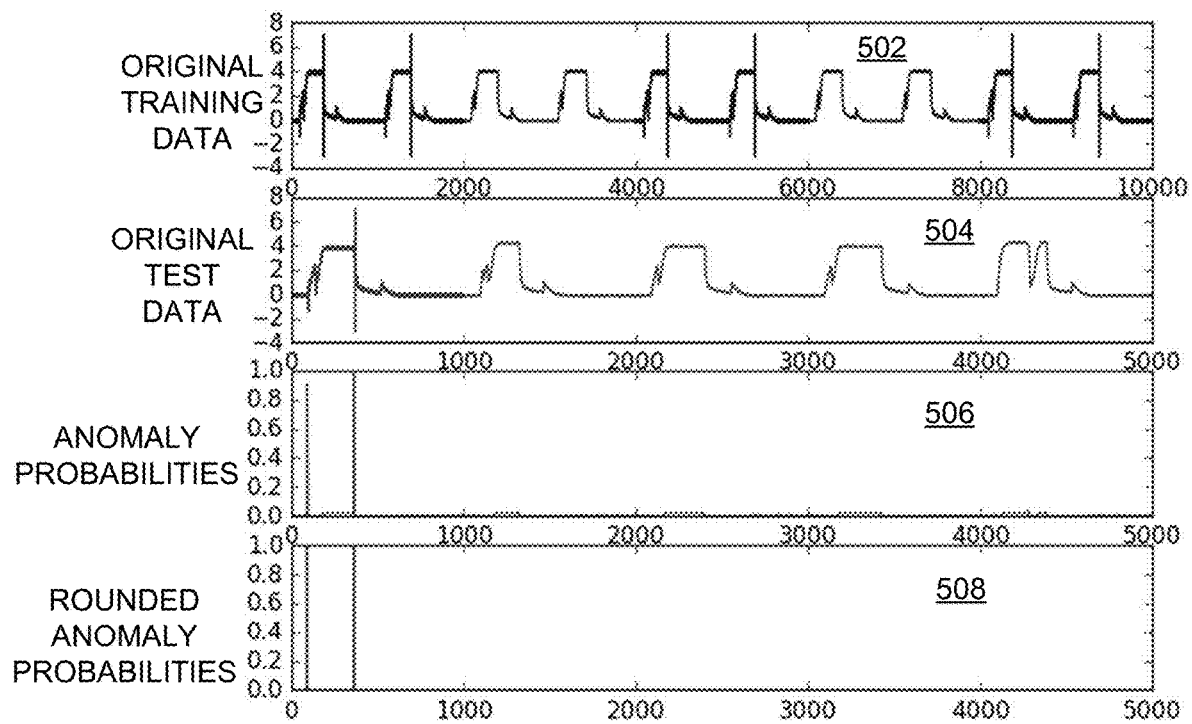
FIG. 5 is graphs of example test results data using an original training dataset.

FIG. 5 illustrates example anomaly detection results using conventional training data. FIG. 5 includes an example graph 502 including a portion of example conventional training data taken from a publicly available dataset having manually labeled anomaly and nominal data. FIG. 5 also includes an example graph 504 including a portion of example test data for the example original training data. Using a long, short-term memory (LSTM) neural network, another example graph 506 of FIG. 5 shows anomaly detection probabilities for the example test data of graph 504, and yet another graph 508 shows rounded anomaly detection probabilities. An anomaly is detected when a value of the graph 508 is one.

Figures 6, 7:
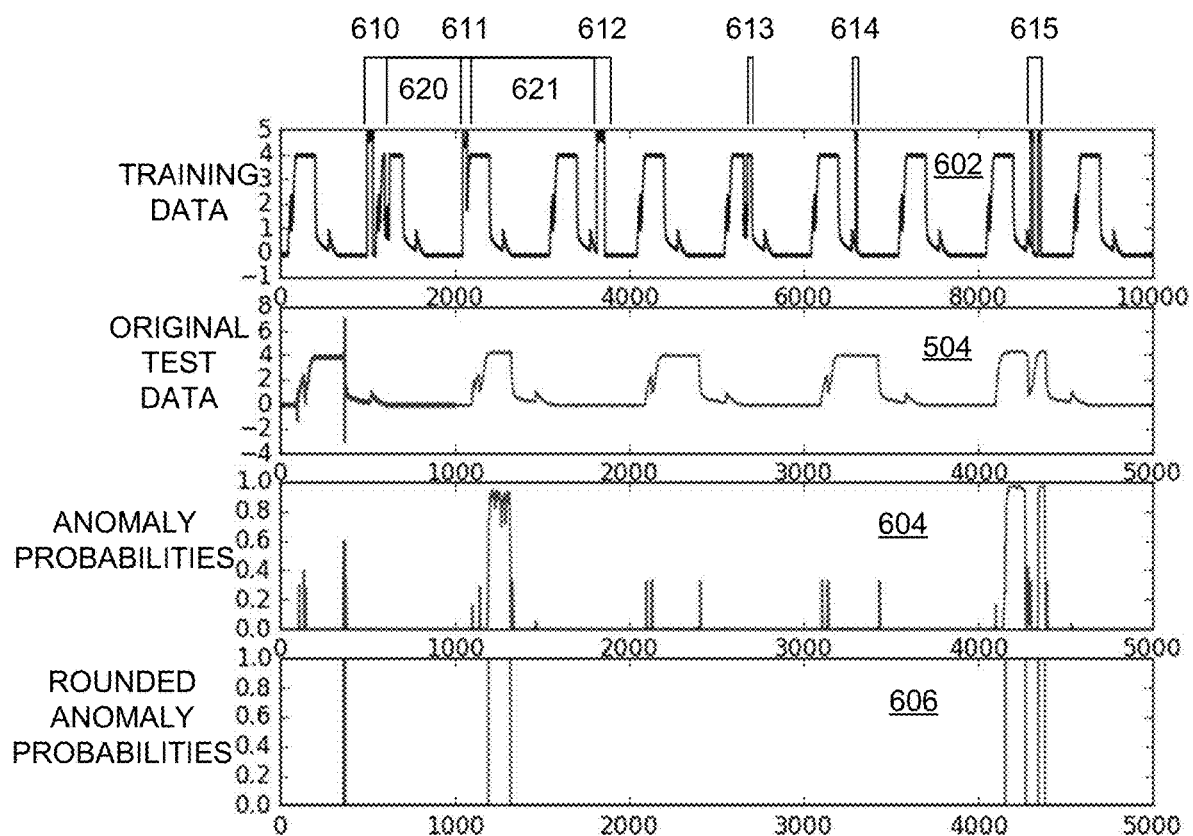
FIG. 6 is graphs of example test results data using an example anomaly detection dataset generated in accordance with this disclosure.
FIG. 7 is a table of example performance results for the examples of FIGS. 5 and 6.

FIG. 6 illustrates example anomaly detection results showing example improvements obtained by using an anomaly detection dataset according to this disclosure. In FIG. 6, the same LSTM neural network is trained using training data 602 that has been generated according to this disclosure rather than the conventional data of graph 502. After training the LSTM neural network with the training data 602, according to this disclosure, rather than original training data 502, the LSTM neural network is tested with the same test data 504. Comparisons of the graphs 506 and 508 of FIG. 5 with respective example graphs 604 and 606, the LSTM neural network detects more anomalies in the test data 504 using the training data 602, according to this disclosure, rather than the original training data 502.

FIG. 7 is a table comparing the example results of FIGS. 5 and 6. The results of FIG. 7 demonstrate a 4.3% improvement in overall accuracy, a 21× improvement in recall, and a 19× improvement in F1 score. An F1 score is a statistical measure of accuracy for binary classification systems. An F1 score reflects a balanced metric of precision and recall. Thus, a large improvement in an F1 score reflects meaningful real world performance improvement. The decrease in precision shown in FIG. 7 reflects a bias in the original results toward only declaring an anomaly when there is high probability of anomaly. That is, the original test results were biased against making an error. This is also reflected in the very low recall value.

Figure 8:
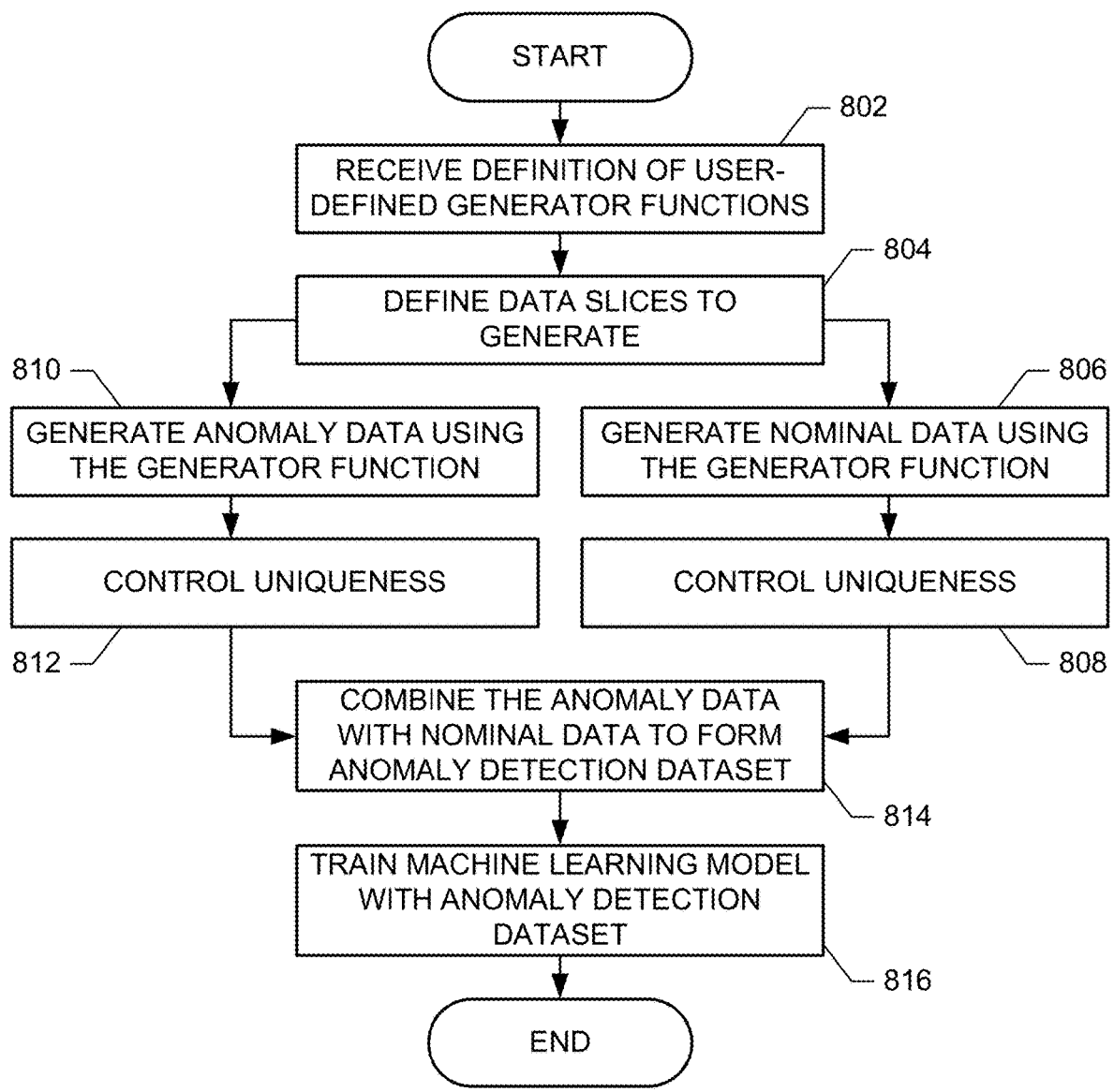
FIG. 8 is a flow diagram representing example processes that may be implemented as machine-readable instructions that may be executed to implement the example dataset generators of FIGS. 1 and 2 to generate anomaly detection datasets.

FIG. 8 is a flow diagram representative of example process(es) that may be implemented as coded computer-readable instructions, the coded instructions may be executed to implement the dataset generators 110 and 200 of FIGS. 1 and 2 to generate anomaly detection datasets. In this example, the coded instructions comprise one or more programs for execution by a processor such as the processor 912 shown in the example processor platform 900 discussed below in connection with FIG. 9. The program(s) may be embodied in the coded instructions and stored on one or more tangible computer-readable storage mediums associated with the processor 912. One or more of the program(s) and/or parts thereof could alternatively be executed by a device other than the processor 912. One or more of the programs may be embodied in firmware or dedicated hardware. Further, although the example process(s) is/are described with reference to the flowchart illustrated in FIG. 8, many other methods of implementing the example dataset generators 110 and 200 may alternatively be used. For example, the order of execution of the blocks may be changed, and/or some of the blocks described may be changed, eliminated, or combined.

As mentioned above, the example process(es) of FIG. 8 may be implemented using coded instructions (e.g., computer-readable instructions and/or machine-readable instructions) stored on one or more tangible computer-readable storage mediums. As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine-readable storage medium" are used interchangeably. Additionally, or alternatively, the example process(es) of FIG. 8 may be implemented using coded instructions (e.g., computer-readable instructions and/or machine-readable instructions) stored on one or more non-transitory computer mediums. As used herein, the term non-transitory computer-readable storage medium is expressly defined to include any type of computer-readable storage device and/or storage disk and to exclude propagating signals and to exclude transmission media. As used herein, "non-transitory computer-readable storage medium" and "non-transitory machine-readable storage medium" are used interchangeably.

Example tangible computer-readable storage mediums include, but are not limited to, any tangible computer-readable storage device or tangible computer-readable storage disk such as a memory associated with a processor, a memory device, a flash drive, a digital versatile disk (DVD), a compact disc (CD), a Blu-ray disk, a floppy disk, a hard disk drive, a random access memory (RAM), a read-only memory (ROM), etc. and/or any other storage device or storage disk in which information is stored for any duration (e.g., for extended time periods, permanently, for brief instances, for temporarily buffering, and/or for caching of the information).

The example process of FIG. 8 includes the example API 206 receiving definitions of user-defined generator functions (block 802), and the example scheduler 210 defining the data slices for the nominal data generator 202 and the anomaly data generator 204 to generate (block 804). For the example of FIG. 6, an example scheduler 210 specified an anomaly detection dataset as repetitions of the example real world nominal signal 400 for the Space Shuttle, with portions that are replaced with anomaly data. Thus, portions of the repeating nominal signal (nominal data slices) are time interspersed, spliced, etc. together with anomaly data slices. In FIG. 6, example time periods 610, 611, 612, 613, 614, 615 are assigned to the anomaly data generator 204 for the generation of anomaly data slices (e.g., blocks of values, string of values, etc.) that are to be placed in those time periods 610-615. Intervening time periods (two examples of which are designated at reference numbers 620 and 621), are assigned to the nominal data generator 202 for generation of repetitions of the nominal input signal 140. The scheduler 210 can specify the time stamps corresponding to the time periods 610-615 to the anomaly data generator 204, and the time stamps corresponding to the time periods 620-621 to the nominal data generator 202.

The example data generator instances 214 of the nominal data generator 202 generates nominal data for the nominal time periods 620-621 (block 806), and the data replication manager 218 handles data replication, if any (block 808). The example data generator instances 214 of the anomaly data generator 204 generates anomaly data for the anomaly time periods 610-615 (block 810), and the data replication manager 218 handles data replication, if any (block 812).

The example dataset merger 220 combines the generated nominal data slices and the generated anomaly data slices to form the anomaly detection dataset 130 (block 814). For example, the dataset merger 220 creates an ordered sequence including an anomaly data slice generated for the time period 610, a nominal data slice generated for the time period 620, another anomaly data slice generated for the time period 611, etc. A machine learning model is trained with the anomaly detection dataset 130 (block 816), and control exits from the example process of FIG. 8.

In FIG. 6, a simple random function, such as the example user-defined generation function 304, is used to generate the anomaly data slices, the anomaly data slices can be generated fully independently from each other, and from the generation of nominal data slices. Likewise, because the nominal data slices are portions of a repeating signal, they can be generated fully independently from each other from a single timestamp. Because the nominal and anomaly data slices for the time periods 604-611 are, thus, fully independent, nominal data slices and anomaly data slices can be generated by a plurality of processor cores executing in parallel and fully independently. Because the data slices are independent, there is no computational burden to combine the data slices. Instead, they may be combined by simple data ordering, as shown herein. Accordingly, very large (e.g., >100 million data inputs) anomaly detection datasets can be easily, quickly and inexpensively defined and generated.

Figure 9:
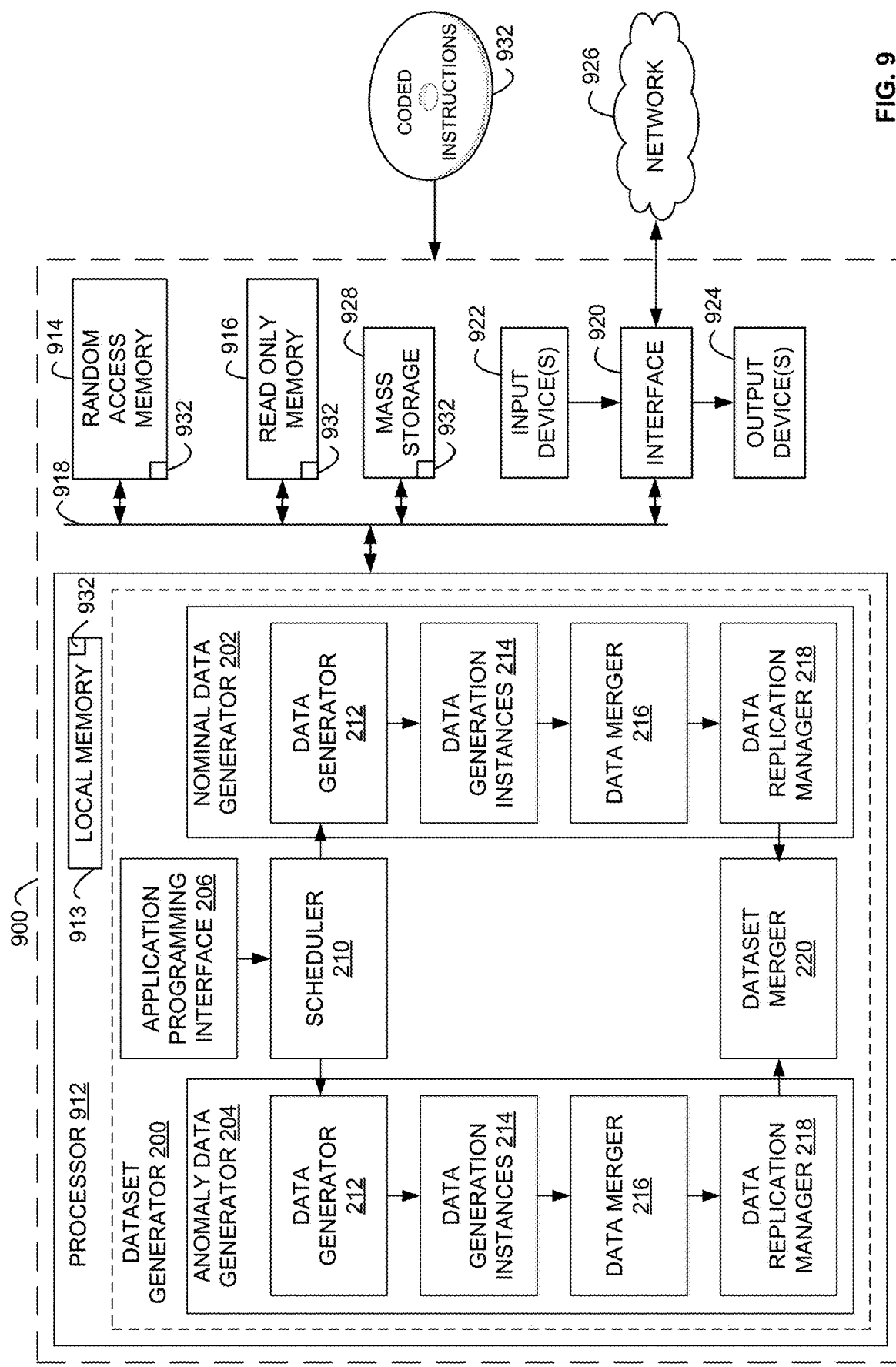
FIG. 9 illustrates an example processor system structured to execute the example instructions of FIG. 8 to implement the example dataset generators of FIGS. 1 and 2.

FIG. 9 is a block diagram of an example processor platform 900 configured to execute the process(es) of FIG. 8 to implement the example dataset generators 110 and 200. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, or controllers from any desired family or manufacturer.

In the illustrated example, the processor 912 implements the example dataset generator 200, the example nominal data generator 202, the example anomaly data generator 204, the example API 206, the example scheduler 210, the example data generators 212, the example data generation instances 214, the example data mergers 216, the example data replication managers 218, and the example dataset merger 220 described above in connection with FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory (RAM) device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 include the machine-readable instructions of FIG. 8 and may be stored in the mass storage device 928, in the volatile memory 914, in the non-volatile memory 916, and/or on a removable tangible computer readable storage medium such as a CD or DVD.

From the foregoing, it will be appreciated that methods, apparatus and articles of manufacture have been disclosed which enhance the operations of a computer to, by among other things, providing anomaly detection datasets that can be used to train machine learning modules that perform significantly better than conventional datasets. From the foregoing, it will be further appreciated that methods, apparatus and articles of manufacture have been disclosed which enhance the operations of a computer to, by among other things, generate anomaly detection datasets that are larger, more robust, can be generated more cost effectively, can be generated more efficiently, can be generated by embarrassingly parallel systems, etc.

Example methods, apparatus, and articles of manufacture to generate anomaly detection datasets are disclosed herein. Further examples and combinations thereof include at least the following:

Example 1 is a method to generate an anomaly detection dataset for training a machine learning model to detect real world anomalies including receiving a user definition of an anomaly generator function, executing, with a processor, the anomaly generator function to generate user-defined anomaly data, and combining the user-defined anomaly data with nominal data to generate the anomaly detection dataset.

Example 2 includes the method of example 1, the user definition of the anomaly generator function including a uniqueness parameter to control data repetition.

Example 3 includes the method of example 1 or 2, further including, executing, with a plurality of processor cores, respective ones of a plurality of instances of the anomaly generator function, each of the plurality of instances to generate respective ones of a plurality of user-defined anomaly data slices.

Example 4 includes the method of example 3, where the plurality of instances are executed by the respective ones of the plurality of processor cores in parallel and independently.

Example 5 includes the method of any of examples 1 to 4, further including receiving a user definition of a nominal generator function, and executing, with a processor, the nominal generator function to generate the nominal data.

Example 6 includes the method of example 5, further including executing, with a first plurality of processor cores, respective ones of a plurality of instances of the anomaly generator function, each of the plurality of instances of the anomaly generator function to generate respective ones of a plurality of user-defined anomaly data slices, and executing, with a second plurality of processor cores, respective ones of a plurality of instances of the nominal generator function, each of the plurality of instances of the nominal generator function to generate respective ones of a plurality of nominal data slices.

Example 7 includes the method of example 6, further including splicing together the user-defined anomaly data slices and the nominal data slices.

Example 8 includes the method of example 6, wherein the plurality of instances of the anomaly generator function and the plurality of instances of the nominal generator function are executed in parallel and independently.

Example 9 includes the method of any of examples 1 to 8, further including training the machine learning model with the generated anomaly detection dataset, and testing real world anomaly detection with the trained machine learning model.

Example 10 includes the method of any of examples 1 to 9, wherein the user-defined anomaly data and the nominal data include respective data slices, and further including splicing the data slices together to combine the user-defined anomaly data with the nominal data.

Example 11 includes the method of any of examples 1 to 10, the user definition including source code, and further including compiling the source code.

Example 12 includes the method of any of examples 1 to 11, the user definition including an executable file.

Example 13 includes an apparatus comprising an interface to receive a user definition of an anomaly generator function, a processor core to execute the anomaly generator function to generate user-defined anomaly data, and a dataset merger to combine the user-defined anomaly data with nominal data to generate an anomaly detection dataset.

Example 14 includes the apparatus of example 13, further including a multitude of processor cores including the processor core, a plurality of instances of the anomaly generator function executing on the multitude of processor cores in parallel.

Example 15 includes the apparatus of example 13 or 14, further including a second processor core to execute a nominal generator function to generate the nominal data.

Example 16 includes the apparatus of example 15, wherein the processor core generates the user-defined anomaly data in parallel with the second processor core generating the nominal data.

Example 17 includes the apparatus of any of examples 13 to 16, wherein the anomaly data includes first data slices, the nominal data includes second data slices, and the dataset merger splices the first data slices with the second data slices to form the anomaly detection dataset.

Example 18 includes a non-transitory computer-readable storage medium comprising instructions that, when executed, cause a machine to at least perform receiving a user definition of an anomaly generator function, executing, with a processor, the anomaly generator function to generate user-defined anomaly data, and combining the user-defined anomaly data with nominal data to generate an anomaly detection dataset.

Example 19 includes the non-transitory computer-readable storage medium of example 18, wherein the instructions, when executed, cause the machine to further perform executing, with a first plurality of processor cores, respective ones of a plurality of instances of the anomaly generator function, each of the plurality of instances to generate respective ones of a plurality of user-defined anomaly data slices.

Example 20 includes the non-transitory computer-readable storage medium of example 19, wherein the instructions, when executed, cause the machine to further perform executing, with a second plurality of processor cores, respective ones of a plurality of instances of a nominal generator function, each of the plurality of instances of the nominal generator function to generate respective ones of a plurality of nominal data slices, and splicing together the user-defined anomaly data slices and the nominal data slices to form the anomaly detection dataset.

Example 21 includes a non-transitory computer-readable storage medium comprising instructions that, when executed, cause a machine to perform the method of any of examples 1 to 12.

Example 22 includes a system including means for receiving a user definition of an anomaly generator function, means for executing the anomaly generator function to generate user-defined anomaly data, and means for combining the user-defined anomaly data with nominal data to generate an anomaly detection dataset.

Example 23 includes the system of example 22, further including means for executing a plurality of instances of the anomaly generator function in parallel.

Example 24 includes the system of example 22 or 23, further including means for executing a nominal generator function to generate the nominal data.

Example 25 includes the system of example 24, wherein the means for generated the user-defined anomaly data operates in parallel with the means for generating the nominal data.

Example 26 includes the system of any of examples 22 to 25, wherein the anomaly data includes first data slices, the nominal data includes second data slices, and the means for combining splices the first data slices with the second data slices to form the anomaly detection dataset.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the transition term in a preamble of a claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method to generate an anomaly detection dataset for training a machine learning model to detect real world anomalies, the method comprising:
   receiving a user definition of an anomaly generator function that is to be executed to generate user-defined anomaly data without using captured data samples of anomalies;
   determining a timeline of data to be generated including the user-defined anomaly data and nominal data, the timeline including a first duration of an anomaly data slice and a second duration of a nominal data slice, the timeline including a sequential ordering;
   executing, with a processor, the anomaly generator function to generate the user-defined anomaly data;
   storing the user-defined anomaly data in a data map including timestamps associated with the data associated with a time range;
   determining that data associated with a subset of the time range includes duplicates;
   discarding duplicate data for the subset of the time range;
   generating new data for the subset of the time range;
   combining the user-defined anomaly data with the nominal data using data ordering to generate the anomaly detection dataset;
   storing the anomaly detection dataset; and
   training a machine learning model utilizing the anomaly detection dataset.

2. The method of claim 1, the user definition of the anomaly generator function including a uniqueness parameter to control data repetition.

3. The method of claim 1, further including, executing, with a plurality of processor cores, respective ones of a plurality of instances of the anomaly generator function, each of the plurality of instances to generate respective ones of a plurality of user-defined anomaly data slices.

4. The method of claim 3, where the plurality of instances are executed by the respective ones of the plurality of processor cores in parallel and independently.

5. The method of claim 1, further including:
receiving a user definition of a nominal generator function; and
executing, with a processor, the nominal generator function to generate the nominal data.

6. The method of claim 5, further including:
executing, with a first plurality of processor cores, respective ones of a plurality of instances of the anomaly generator function, each of the plurality of instances of the anomaly generator function to generate respective ones of a plurality of user-defined anomaly data slices; and
executing, with a second plurality of processor cores, respective ones of a plurality of instances of the nominal generator function, each of the plurality of instances of the nominal generator function to generate respective ones of a plurality of nominal data slices.

7. The method of claim 6, further including splicing together the user-defined anomaly data slices and the nominal data slices.

8. The method of claim 6, wherein the plurality of instances of the anomaly generator function and the plurality of instances of the nominal generator function are executed in parallel and independently.

9. The method of claim 1, further including:
testing real world anomaly detection with the trained machine learning model.

10. The method of claim 1, wherein the user-defined anomaly data and the nominal data include respective data slices, and further including splicing the data slices together to combine the user-defined anomaly data with the nominal data.

11. The method of claim 1, the user definition including source code, and further including compiling the source code.

12. The method of claim 1, the user definition including an executable file.

13. An apparatus comprising:
an interface to receive a user definition of an anomaly generator function that is to be executed to generate user-defined anomaly data without using captured data samples of anomalies;
a processor core to:
determine a timeline of data to be generated including the user-defined anomaly data and nominal data, the timeline including a first duration of an anomaly data slice and a second duration of a nominal data slice, the timeline including a sequential ordering;
execute the anomaly generator function to generate user-defined anomaly data;
cause the user-defined anomaly data in a data map including timestamps associated with the data associated with a time range to be stored;
determine that data associated with a subset of the time range includes duplicates;
discard duplicate data for the subset of the time range; and
generate new data for the subset of the time range; and
a dataset merger including a logic circuit to combine the user-defined anomaly data with nominal data using data ordering to generate and store an anomaly detection dataset, wherein the processor core is to train a machine learning model utilizing the anomaly detection dataset.

14. The apparatus of claim 13, further including a multitude of processor cores including the processor core, a plurality of instances of the anomaly generator function executing on the multitude of processor cores in parallel.

15. The apparatus of claim 13, further including a second processor core to execute a nominal generator function to generate the nominal data.

16. The apparatus of claim 15, wherein the processor core is to generate the user-defined anomaly data in parallel with the second processor core generating the nominal data.

17. The apparatus of claim 13, wherein the anomaly data includes first data slices, the nominal data includes second data slices, and the dataset merger is to splice the first data slices with the second data slices to form the anomaly detection dataset.

18. A non-transitory computer-readable storage medium comprising instructions that, when executed, cause a machine to at least perform:
receiving a user definition of an anomaly generator function that is to be executed to generate user-defined anomaly data without using captured data samples of anomalies;
determining a timeline of data to be generated including the user-defined anomaly data and nominal data, the timeline including a first duration of an anomaly data slice and a second duration of a nominal data slice, the timeline including a sequential ordering;
executing, with a processor, the anomaly generator function to generate user-defined anomaly data;
storing the user-defined anomaly data in a data map including timestamps associated with the data associated with a time range;
determining that data associated with a subset of the time range includes duplicates;
discarding duplicate data for the subset of the time range;
generating new data for the subset of the time range;
combining the user-defined anomaly data with nominal data using data ordering to generate an anomaly detection dataset;
storing the anomaly detection dataset; and
training a machine learning model utilizing the anomaly detection dataset.

19. The non-transitory computer-readable storage medium of claim 18, wherein the instructions, when executed, cause the machine to further perform executing, with a first plurality of processor cores, respective ones of a plurality of instances of the anomaly generator function, each of the plurality of instances to generate respective ones of a plurality of user-defined anomaly data slices.

20. The non-transitory computer-readable storage medium of claim 19, wherein the instructions, when executed, cause the machine to further perform:
executing, with a second plurality of processor cores, respective ones of a plurality of instances of a nominal generator function, each of the plurality of instances of the nominal generator function to generate respective ones of a plurality of nominal data slices; and
splicing together the user-defined anomaly data slices and the nominal data slices to form the anomaly detection dataset.

* * * * *